United States Patent
Conete et al.

(10) Patent No.: US 8,590,316 B2
(45) Date of Patent: Nov. 26, 2013

(54) CMC MIXER WITH STRUCTURAL OUTER COWLING

(75) Inventors: Eric Conete, Merignac (FR); Benoît Carrere, Le Taillan Medoc (FR); Laurent Baroumes, Bordeaux (FR)

(73) Assignee: SNECMA Propulsion Solide, Le Haillan Cedex (FR)

( * ) Notice: Subject to any disclaimer, the term of this patent is extended or adjusted under 35 U.S.C. 154(b) by 997 days.

(21) Appl. No.: 12/594,874

(22) PCT Filed: Apr. 8, 2008

(86) PCT No.: PCT/FR2008/050623
§ 371 (c)(1),
(2), (4) Date: Jan. 5, 2010

(87) PCT Pub. No.: WO2008/139114
PCT Pub. Date: Nov. 20, 2008

(65) Prior Publication Data
US 2010/0126183 A1  May 27, 2010

(30) Foreign Application Priority Data
Apr. 10, 2007 (FR) ..................................... 07 02589

(51) Int. Cl.
*F02K 1/04* (2006.01)
(52) U.S. Cl.
USPC .......................... 60/770; 60/799; 239/265.19
(58) Field of Classification Search
USPC ................ 60/262, 264, 770, 226.1, 796, 799; 239/265.17, 265.19; 181/213, 220
See application file for complete search history.

(56) References Cited

U.S. PATENT DOCUMENTS

| | | | | |
|---|---|---|---|---|
| 4,226,085 A * | 10/1980 | Johnson | ........................ | 60/262 |
| 4,481,698 A | 11/1984 | Salerno | | |
| 5,249,877 A | 10/1993 | Corsmeier | | |
| 6,012,281 A * | 1/2000 | Hauser | ........................ | 60/204 |
| 2004/0255573 A1 | 12/2004 | Rago | | |
| 2008/0115484 A1 | 5/2008 | Conete et al. | | |

FOREIGN PATENT DOCUMENTS

| | | |
|---|---|---|
| EP | 0898071 | 2/1999 |
| FR | 2875854 | 3/2006 |
| GB | 2014665 | 8/1979 |

* cited by examiner

*Primary Examiner* — Andrew Nguyen
(74) *Attorney, Agent, or Firm* — Preti Flaherty Beliveau & Pachios LLP (57) ABSTRACT

The invention relates to a mixer (100) for a separate-stream nozzle of a turbojet, the mixer being designed to mix a hot inner stream from the combustion chamber of the turbojet with a cold outer stream from the fan of the turbojet. The mixer comprises an inner shroud (120) defining a flow channel for said hot inner stream, an outer shroud (110) disposed around the inner shroud (120) and co-operating therewith to define a flow channel for said cold outer stream, and a lobed structure (130) having lobes (1321, 1322) extending longitudinally from the trailing edges (110a, 120a) of said shrouds. The lobed structure (130) is made of a ceramic matrix composite material and is attached to the outer shroud (110) by flexible fastener tabs (140).

15 Claims, 8 Drawing Sheets

CMC MIXER WITH STRUCTURAL OUTER COWLING

BACKGROUND OF THE INVENTION

The present invention relates to the general field of nozzles that are fitted to airplane turbojets. The invention relates more particularly to the separate-stream nozzles fitted with stream mixers that served to improve the performance of the engine while also reducing the noise emitted by the jet leaving the outlet from the nozzle.

Figure 1:
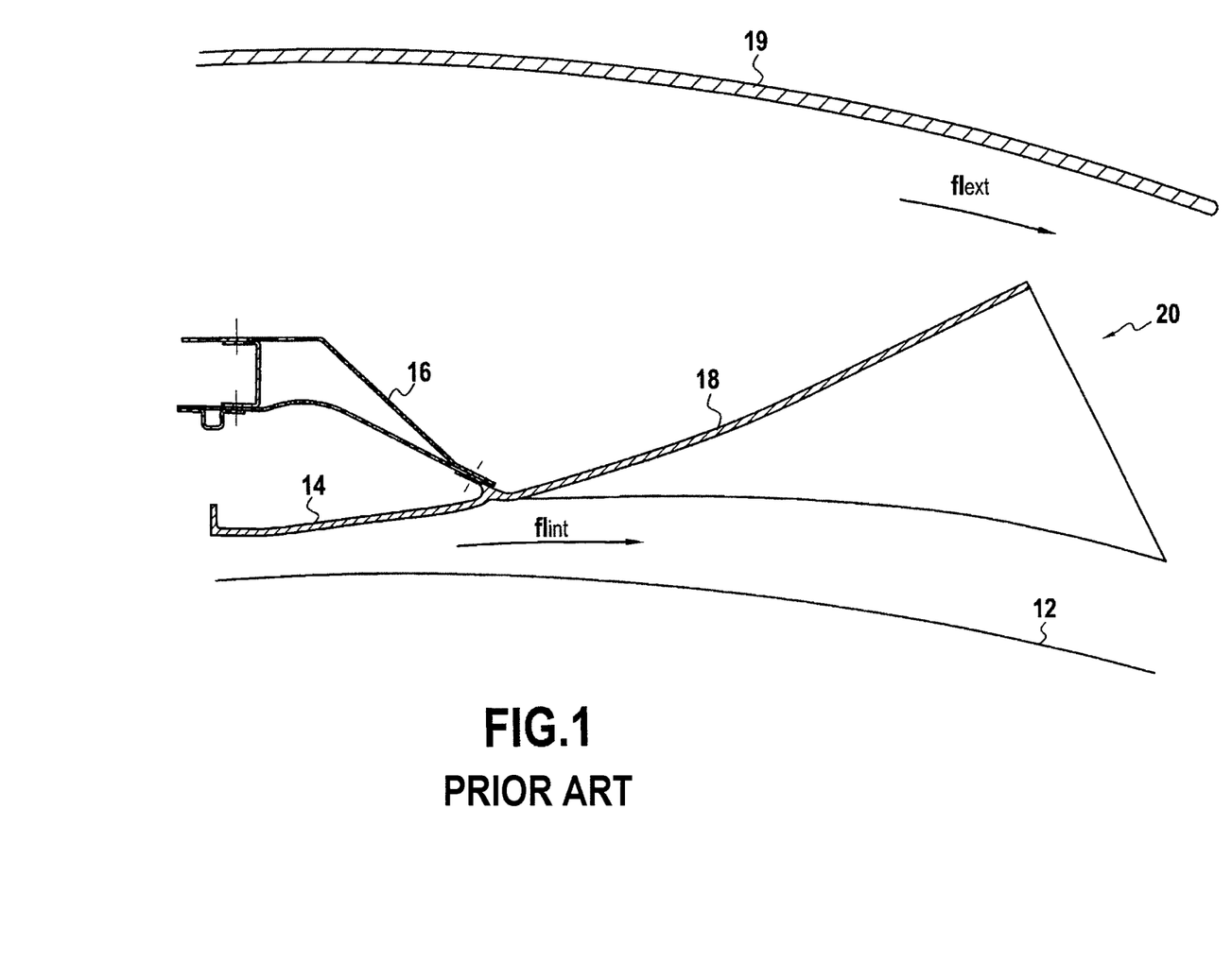
FIG. 1 is a highly diagrammatic half-section view of a separate-stream nozzle of a prior art turbojet.

More precisely, as shown very diagrammatically in FIG. 1, a separate-stream nozzle for a turbojet typically comprises, from the inside towards the outside, a central body 12 (also referred to as a "plug"), an inner shroud 14, a secondary cap or outer cowling 16, and a nacelle 19 centered on the axis X-X' of the nozzle.

The inner shroud 14, of substantially cylindrical shape, extends along the axis X-X' of the nozzle, the central body 12 being placed concentrically inside the outer shroud 14 and terminating in a portion that is substantially conical. The inner shroud 14 defines a first annular channel for passing a hot inner stream (or primary stream) coming from the combustion chamber. The inner shroud corresponds to the exhaust casing of the nozzle.

The secondary cap 16 is disposed concentrically around the inner shroud 14 and it co-operates with the nacelle 19 to define a second annular channel for passing a cold outer stream (or secondary stream) coming from the fan.

In known manner and in order to reduce specific consumption, the nozzle is provided with a mixer 18 having a special design to encourage mixing between the hot inner stream $fl_{int}$ and in the cold outer stream $fl_{ext}$ coming from the turbojet. As shown in FIG. 1, the mixer 18 comprises a lobed structure 20 that represents one of the designs that is presently in the most widespread use in civil turbojets. The lobed mixer serves to obtain radial shear between the hot inner stream and the cold outer stream so as to encourage mixing between these streams. The mixer 18 is fastened to the inner shroud 14.

Embodiments of lobed mixers for separate-stream nozzles are described in particular in the following documents: EP 1 141 534, U.S. Pat. No. 5,755,092, and U.S. Pat. No. 5,924,632.

Nevertheless, although a mixer of that type does indeed improve the efficiency and the noise performance of a turbojet having a separate-stream nozzle, it inevitably leads to an increase in the weight of the nozzle, with that having an impact on the overall dynamics of the engine and on its connection with the pylon of the airplane.

In the technique that is the most widespread at present, the lobed mixer is made as a single piece using a metallic material, typically Inconel® 625, the lobed structure being connected to the inner shroud via a Y-shaped ring enabling an outer cowling also to be fastened. Such a mixer presents non-negligible additional weight that is cantilevered out in the engine, thereby leading to an increase in the mechanical loading on the flange of the exhaust casing of the nozzle. Furthermore, the Y-shaped ring is heavily stressed by the temperature gradients present between the first annular channel for passing the hot inner stream and the second annular channel for passing the cold outer stream.

In order to reduce the mechanical loads generated by the presence of such a weight at the outlet from the nozzle, one solution consists in making the major fraction of the surface of the mixer, i.e. the lobed structure, out of a ceramic matrix composite material (CMC material), which material is lighter than a metallic material.

Figure 2:
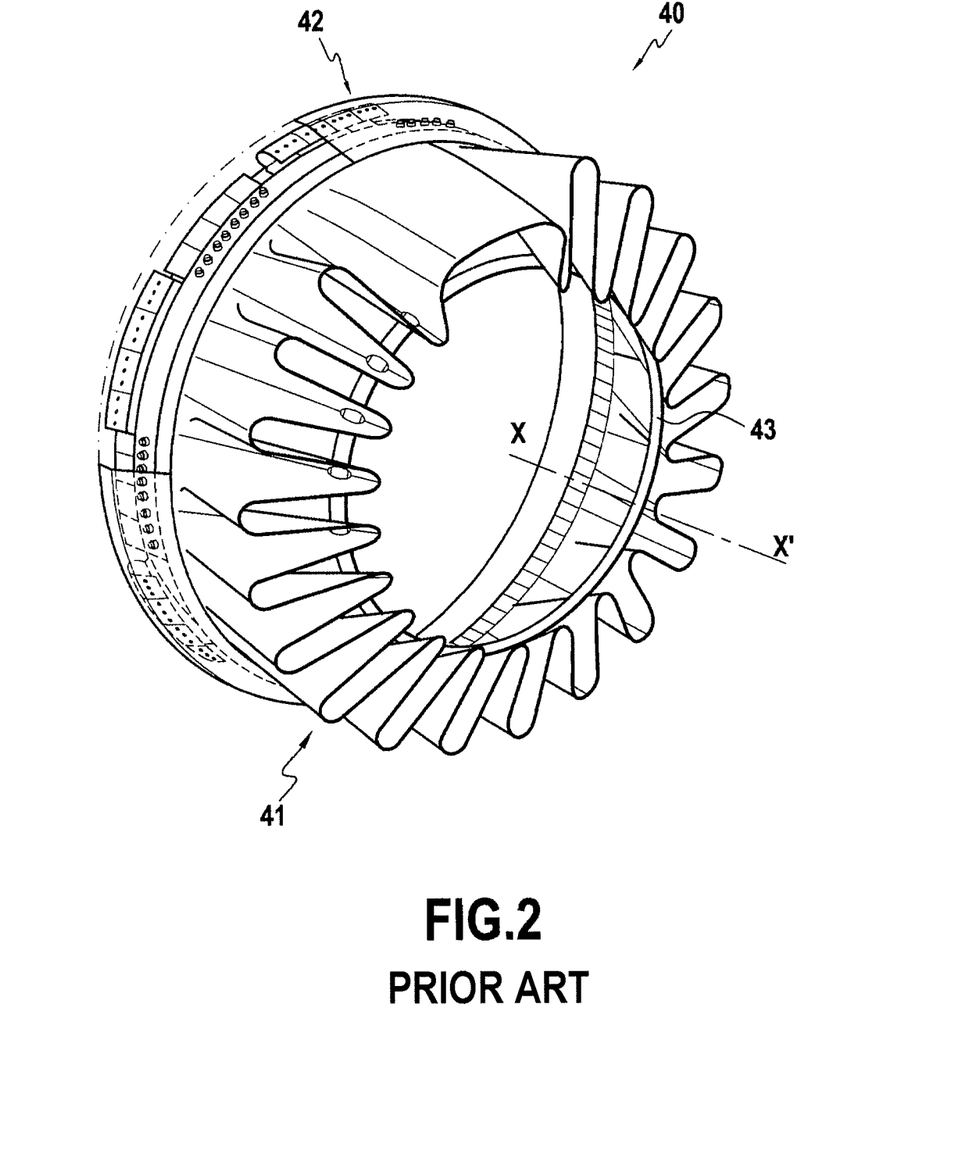
FIG. 2 is a perspective view of a mixer for a prior art turbojet nozzle.

FIG. 2 shows a mixer 40 that comprises a lobed structure 41 made of CMC, and a fastener shroud 42 made of metallic material for connecting the mixer to the exhaust casing of a nozzle. The lobed structure 41 also includes a stiffener ring 43 interconnecting the inner lobes of the structure in order to reinforce the mechanical strength of the lobed structure overall. That mixer is described in detail in the document WO 2006/035186.

The operation of that mixer has been proven, but although its architecture enables a significant weight saving to be achieved (about 40%) compared with a one-piece metallic mixer, it nevertheless still presents certain drawbacks.

Figure 3:
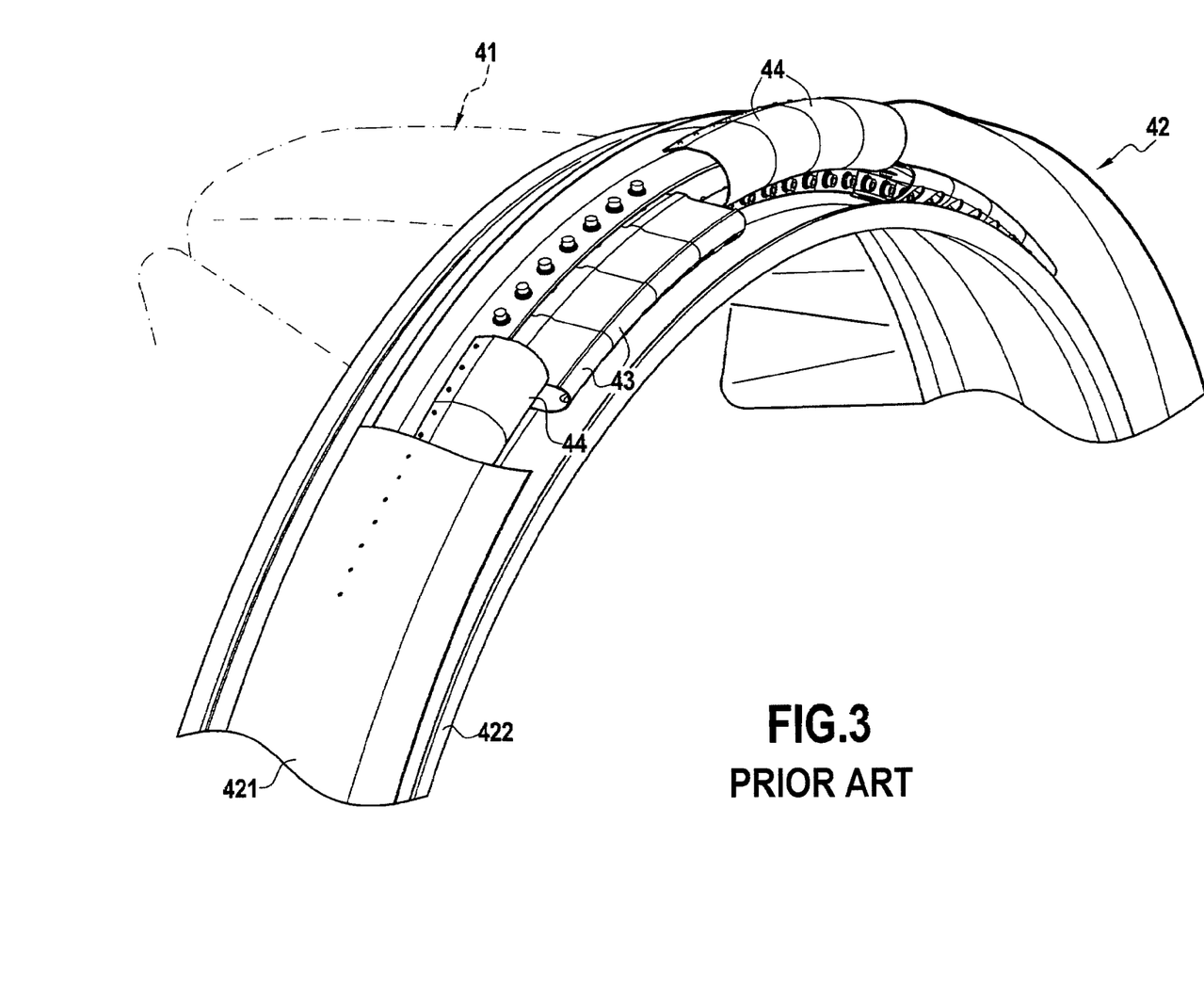
FIG. 3 is a face view of the FIG. 2 mixer.

Incorporating the lobed structure 41 made of CMC material requires a large number of metallic parts to be used, thereby encroaching on the weight savings. In particular, as shown in FIG. 3, the lobed structure 41 is fastened to the inner shroud 422 of the fastener shroud 42 via flexible metallic fastener tabs 43 that serve to compensate for differential expansion between the lobed structure made of CMC material and the inner shroud made of metallic material. Likewise, in order to accommodate differential expansion between the outer shroud 421 and the inner shroud 422, which are subjected to streams at different respective temperatures (cold outer stream and a hot inner stream), flexible metallic fastener tabs 44 are used to fasten the inner shroud 422 to the outer shroud 421.

Furthermore, those flexible connections, and in particular the tabs 43, need to accommodate steep temperature gradients leading to high levels of mechanical stress in the lobed structure, thereby reducing its lifetime.

Finally, the presence of the stiffener ring gives rise to losses of performance, leading to an increase in the specific consumption of the turbojet, thereby limiting to some extent the benefit obtained by lightning the weight of the mixer.

OBJECT AND BRIEF SUMMARY OF THE INVENTION

An object of the present invention is to propose a novel design of mixer having a structure with CMC lobes, in which the number of metallic parts can be reduced so as to further increase savings in weight, while reducing the stresses applied to the lobed structure, in order to improve its lifetime.

To this end, the present invention provides a mixer comprising an inner shroud defining a flow channel for the hot inner stream, an outer shroud placed around the inner shroud and co-operating therewith to define a flow channel for the cold outer stream, and a lobed structure having lobes extending longitudinally from the trailing edges of said shrouds, in which mixer, the lobed structure is made of a ceramic matrix composite material and is attached to the outer shroud by flexible connections means.

Thus, by attaching the CMC lobed structure to the outer shroud, it is possible to provide a mixer having a quantity of metallic parts that is smaller than in prior art mixers in which the lobed structure is attached to the inner shroud. With the architecture of the mixer of the invention, the inner shroud no longer has the function of supporting the lobed structure. It performs only the "liner" function of channeling the hot inner stream. The weight of the inner shroud can thus be significantly reduced, in particular by omitting the previously-necessary intermediate flange for connection with the lobed structure, and also by reducing the thickness of its wall and of its fastener flange.

Furthermore, since the outer shroud forms part of the "cold" portion of the mixer (i.e. a portion that is not subjected to the hot inner stream), it expands little and consequently transmits less mechanical stress to the lobed structure than does the inner shroud. The lifetime of the CMC lobed structure is thus improved. Furthermore, because of the lesser expansion of the outer shroud, only limited expansion differences between the lobed structure and the outer shroud need to be compensated in order to avoid inducing excessive mechanical loads on the lobed structure. Consequently, the number of flexible connections between the lobed structure and the outer shroud can be smaller than the number of flexible connections needed when connecting the lobed structure to the inner shroud, as described in particular in document WO 2006/035186.

In an aspect of the invention, the lobed structure is attached to the outer shroud by means of flexible fastener tabs made of metallic material. Since the lobed structure is made of a CMC material having a low coefficient of thermal expansion, and since the outer shroud is subjected to the cold outer stream, differential expansion between these two elements is limited, thus making it possible to use relatively compact fastener tabs and to reduce the overall size of the mixer, making it suitable for being incorporated in cavities of low height.

Since the inner shroud no longer has any structural function in the mixer of the present invention, expansion thereof no longer has any influence on the lobed structure. It may be fastened directly to the outer shroud, thus making it possible to avoid using flexible metallic fastener tabs and to further reduce the weight of the mixer. In an aspect of the invention, the inner shroud and the outer shroud include respective flanges, the shrouds being fastened to each other by assembling the flanges together.

The major portion of the invention, i.e. the lobed structure, is made of a ceramic matrix composite material, thus making it possible significantly to reduce the weight of the mixer, and consequently the weight of the nozzle by about 40% relative to a nozzle fitted with a mixer that is made entirely of metal.

Furthermore, since the lobed structure is made of a thermostructural composite material, it possesses good mechanical properties, and it retains these properties and high temperature.

The term "ceramic matrix composite (CMC) material" is used to designate materials constituted by reinforcement of refectory fibers (carbon fibers or ceramic fibers) densified by a matrix that is at least partially ceramic. Such CMC materials are constituted in particular by composites having carbon fiber reinforcement and a silicon carbide matrix (C/SiC), composites having carbon fiber reinforcement and a matrix comprising both a carbon phase, generally closer to the fibers, and also a silicon carbide phase (C/C—SiC), composites having reinforcement and a matrix both made of silicon carbide (SiC/SiC), and oxide/oxide composites.

The lobed structure is preferably made of a SiC/SiC composite material that presents a Young's modulus that is three times greater than that of a C/SiC composite material, thereby enabling the lobed structure to be given sufficient stiffness to avoid using a stiffener ring as described in document WO 2006/035186.

The lobed structure may be made as a single piece, or it may be assembled from a plurality of sectors, thus making it possible, under certain circumstances, to facilitate fabrication of the lobed structure and to reduce replacement costs.

The present invention provides also a turbojet having a separate-stream nozzle that includes a mixer as defined above.

BRIEF DESCRIPTION OF THE DRAWINGS

Other characteristics and advantages of invention appear from the following description of particular embodiments of the invention, given as nonlimiting examples, and with reference to the accompanying drawings, in which.

DETAILED DESCRIPTION OF AN EMBODIMENT

Figure 4:
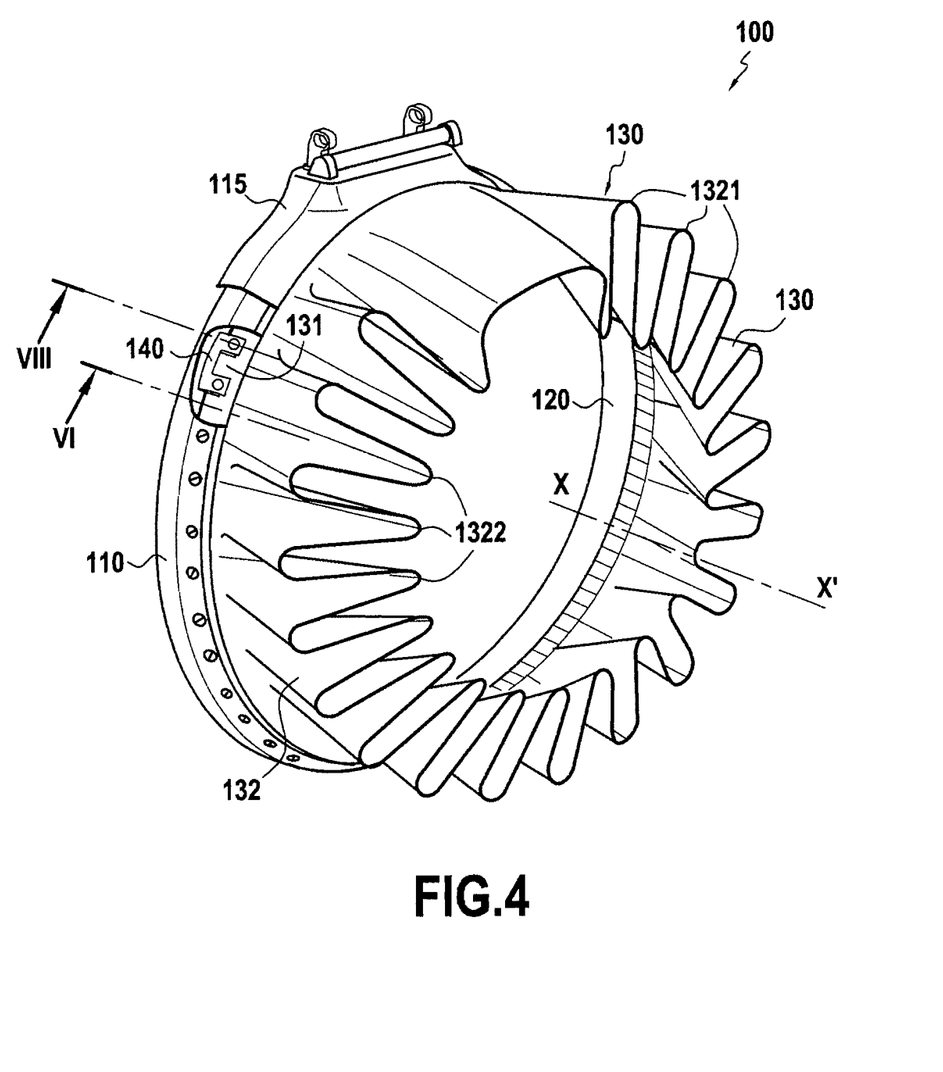
FIG. 4 is a perspective view of a mixer for a separate-stream nozzle of a turbojet constituting an embodiment of the invention.

FIG. 4 shows a mixer 100 for a separate-stream turbojet nozzle constituting an embodiment of the invention. The mixer, which extends along a longitudinal axis X-X', comprises an inner shroud 120 of metallic material (e.g. Inconel® 625) defining a flow channel for the hot inner stream, an outer shroud 110 of metallic material (e.g. Inconel® 625) for connecting the mixer to the exhaust casing of a turbojet nozzle (not shown), and a lobed structure 130 at the downstream end of which mixing takes place between the hot inner stream from the turbojet combustion chamber (also referred to as the primary stream) that flows inside the mixer, and the cold outer stream, e.g. coming from the upstream fan (also referred to as the secondary stream) that flows outside the mixer.

The lobed structure 130 presents an upstream portion 131 for attaching to the outer shroud 110 of the mixer. In order to improve the performance of the turbojet, the structure 130 comprises a downstream portion 132 that extends longitudinally from the trailing edges of the shrouds 110 and 120, and that presents a series of undulations forming a plurality of outer lobes 1321 and inner lobes 1322 that are distributed circumferentially around the longitudinal axis X-X' of the mixer. In well known manner, the use of such a lobed structure in a nozzle for mixing the inner stream and the outer stream serves to control the mixing between those two streams so as to improve the performance of the turbojet and reduce the noise it emits. The mixer 100 also includes an element 115 that serves to smooth the secondary stream in the zone of the connection with the pylon of the airplane (not shown). The element 115 is aligned with a flattened lobe of the lobed structure 130 above which the extension of the airplane pylon will be placed, the cold outer stream flowing along the extension of the pylon. The element 115 includes lugs for fastening the secondary nozzle (not shown).

In accordance with the present invention, the lobed structure 130 is made of a ceramic matrix composite (CMC) material, i.e. a material made of refractory fiber reinforcement (carbon fibers or ceramic fibers) densified by a matrix that is at least partially ceramic. Ceramic matrix composite materials are known for their good mechanical properties and their ability to conserve these properties at high temperature. Consequently, the lobed structure of the invention is constituted by a material that is particularly well suited for withstanding the temperatures of the streams generated upstream in the turbomachine, and in particular the temperatures of the hot gases coming from the combustion chamber (inner stream).

In order to fabricate the lobed structure of the present invention, a fiber preform is made of refractory fibers (carbon fibers or ceramic fibers), which preform has substantially the same shape as the lobed structure that is to be produced. This preform is subsequently densified, in well known manner, using a liquid and/or a gaseous technique.

Liquid densification consists in impregnating the preform by a liquid composition containing a precursor for the material of the matrix. The precursor is commonly in the form of a polymer, such as a resin, possibly diluted in a solvent. The precursor is transformed into ceramic by heat treatment, after eliminating the solvent if any, and after curing the polymer. It is possible to perform a plurality of successive impregnation cycles in order to achieve the desired degree of densification. By way of example, liquid precursors of carbon may be resins having a relatively high coke content, such as phenolic resins, whereas liquid precursors of ceramic, in particular of SiC, may be resins of the polycarbosilane (PCS) type or of the polytitanocarbosilane (PTCS) type.

The gaseous method consists in chemical vapor infiltration. The fiber preform corresponding to the structure that is to be made is placed in an oven into which a reaction gas is admitted. The pressure and the temperature inside the oven, and the composition of the gas are selected in such a manner as to enable the gas to diffuse within the pores of the preform so as to form the matrix therein by depositing a solid material on the fibers, which solid material results from decomposition of a component of the gas or from a reaction between a plurality of components. By way of example, gaseous precursors for carbon may be hydrocarbons such as methane and/or propane that produce carbon by cracking, and a gaseous precursor for ceramic, in particular for SiC, may be methyl trichlorosilane (MTS) that gives SiC by decomposition of the MTS.

There are also exist combined methods making use both of liquid techniques and gaseous techniques.

The lobed structure of the invention may be made of one of the following ceramic matrix composite (CMC) materials: composites having carbon fiber reinforcement and silicon carbide matrix (C/SiC), composites having carbon fiber reinforcement and a matrix comprising both a carbon phase, generally closer to the fibers, and a silicon carbide phase (C/C—SiC), and composites having fiber reinforcement and a matrix both made of silicon carbide (SiC/SiC).

Nevertheless, the lobed structure is preferably made of a SiC/SiC composite material that presents a Young's modulus that is three times greater than that of a C/SiC composite material, thereby enabling the lobed structure to be given sufficient stiffness to avoid using a stiffener ring as described in document WO 2006/035186.

With a lobed structure made of a C/SiC for C/C—SiC composite material, the use of a stiffener ring as described in document WO 2006/035186 is desirable.

Figure 5A:
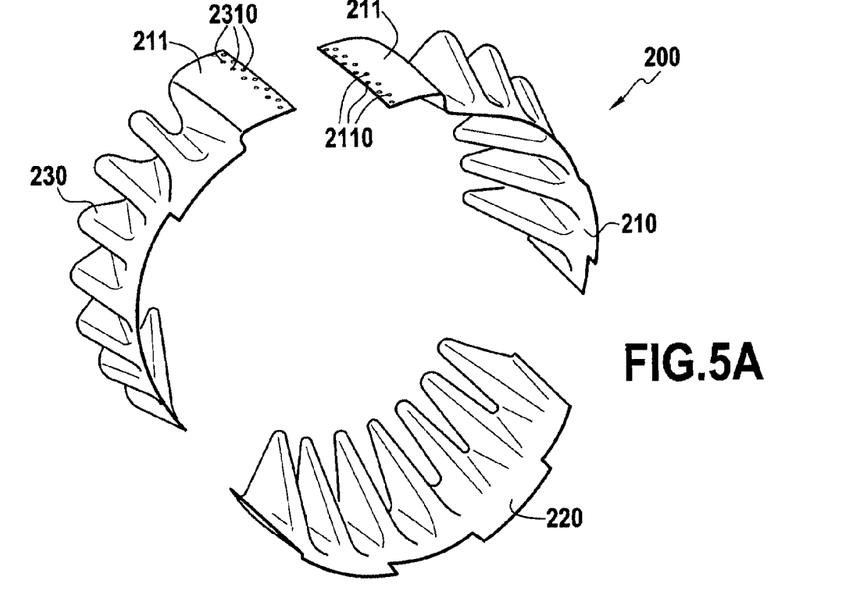
FIG. 5A is a perspective view of a plurality of sectors used for forming a lobe structure in accordance with another embodiment of the invention.
Figure 5B:
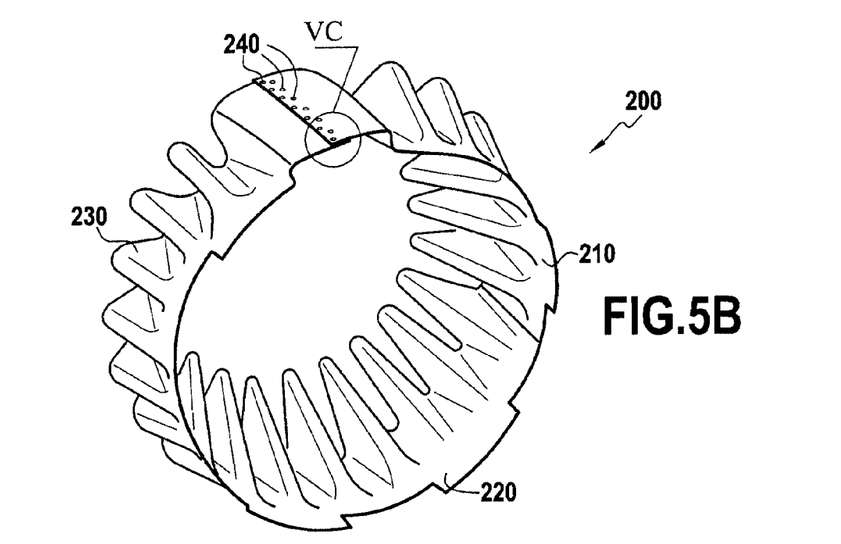
FIG. 5B is a perspective view of a lobe structure obtained after assembling together the sectors of FIG. 5A.
Figure 5C:
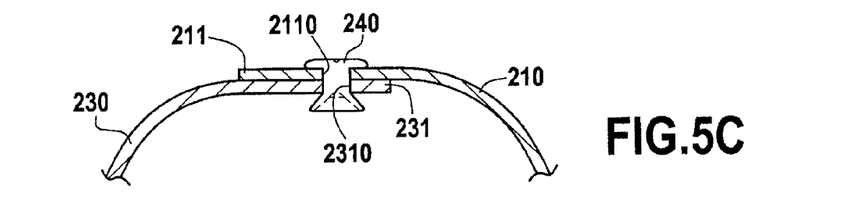
FIG. 5C is an enlarged section view on line VC of FIG. 5B.

The lobed structure of the invention can be made directly as a single piece. Nevertheless, the lobed structure may also be made up from a plurality of assembled-together sectors, and this can be advantageous in certain circumstances, in particular because of the complex shape of the structure that is to be made. An embodiment of the sectorized lobed structure is shown in FIGS. 5A to 5C. As shown in FIG. 5A, the lobed structure 200 is made by assembling together three sectors 210, 220, 230 that are made of ceramic matrix composite material using one of the above-described fabrication methods. Once the sectors have been made, they are connected together via their ends so as to make up a single lobed structure 200 as shown in FIG. 5B. In an embodiment, the sectors can be assembled to one another by means of riveted connections. As shown in FIG. 5C, the respective ends 211 and 231 of two adjacent sectors 210 and 230 are superposed, with each end 211 and 231 having a respective plurality of orifices 2110 or 2310 that co-operate mutually once the two ends have been superposed. Thereafter, a rivet 240 is passed through each passage formed by two co-operating orifices 2110 and 2310, thereby holding the sectors together. Other fastener means (e.g. bolted connections, brazing, ... ) can naturally be used for assembling the sectors together.

In order to fabricate a lobed mixer structure out of CMC material, reference may also be made to document FR 07/53201.

Figure 6:
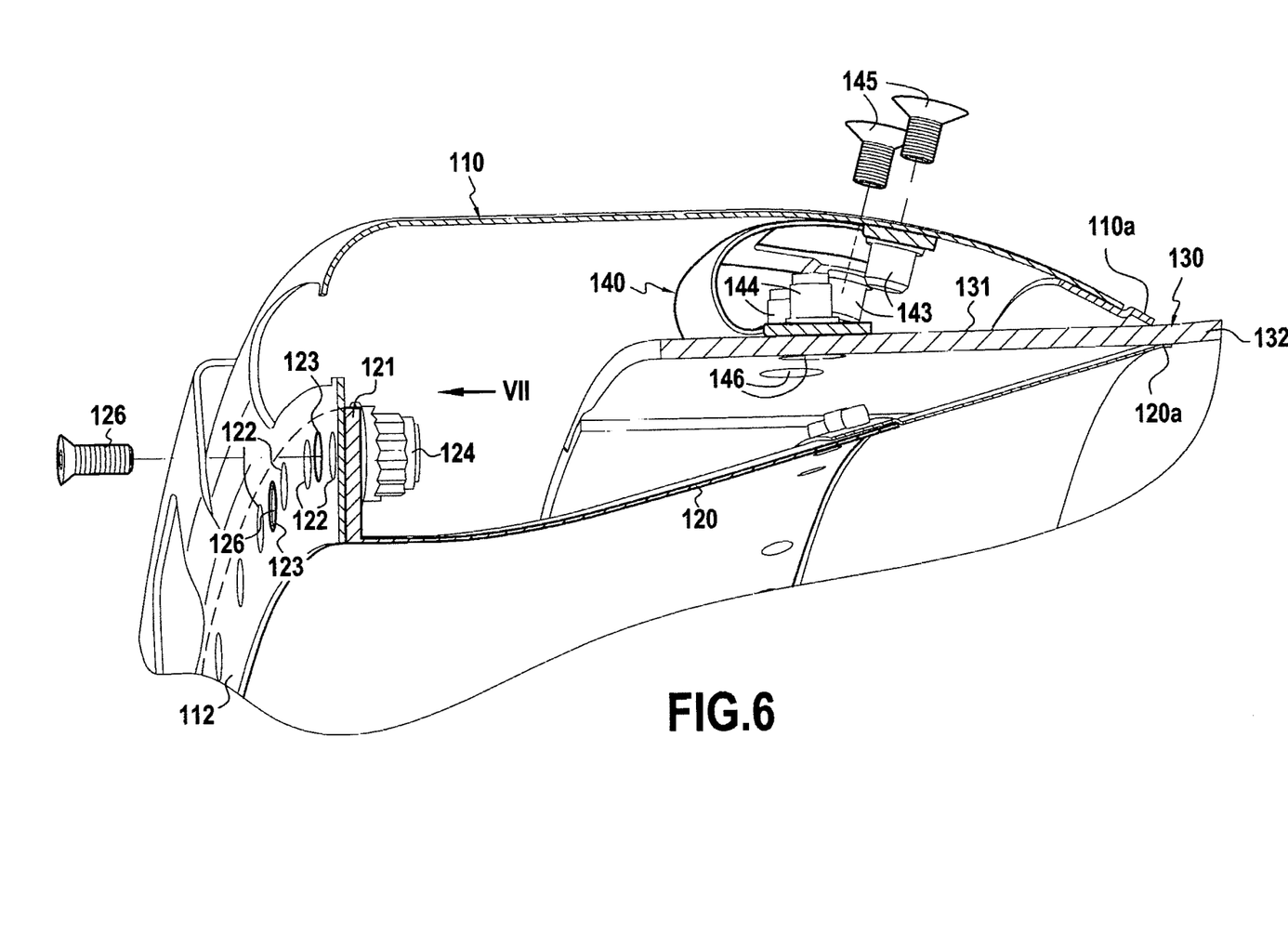
FIG. 6 is a perspective view on section plane VI of FIG. 4.

In accordance with the invention and as shown in FIG. 6, the lobed structure 130 is attached via its upstream portion 131 to the outer shroud 110 by means of flexible fastener tabs 140 there are distributed angularly, and preferably uniformly, between the lobed structure and the outer shroud. The remainder of the lobed structure 130, i.e. the portion 132 having the lobes, extends longitudinally from the respective trailing edges 110a and 120a of the outer shroud 110 and of the inner shroud 120. The flexible fastener tabs 140 serve to compensate for differences of expansion between the lobed structure 130 and the outer shroud 110, and to limit the mechanical loading induced on the lobed structure. They also make it possible to accommodate tolerances in fabrication and assembly. The tabs 140 are made of metallic material, preferably material that is identical to that of the outer shroud 110. The number of flexible fastener tabs 140 depends on the diameter of the mixer. By way of example, for a mixer having a diameter of 800 millimeters (mm), nineteen flexible fastener tabs suffice for providing good support to the lobed structure and for effectively taking up differential expansion between the lobed structure and the outer shroud.

Figure 7:
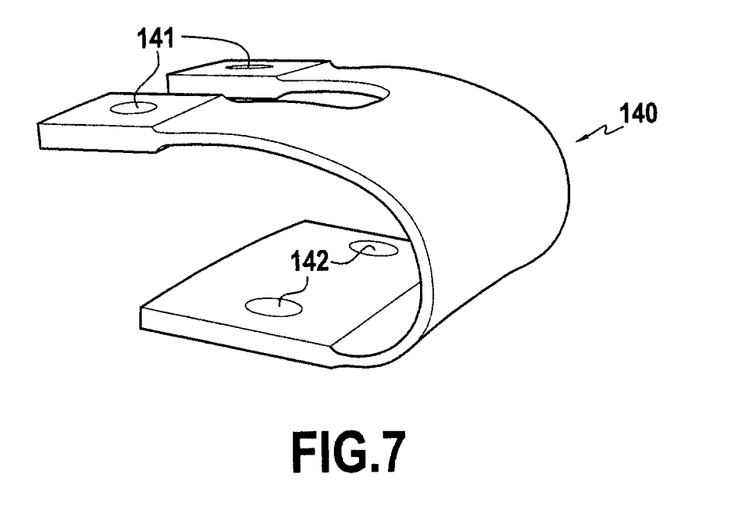
FIG. 7 is a perspective view of a fastener tab of FIG. 4.
Figure 8:
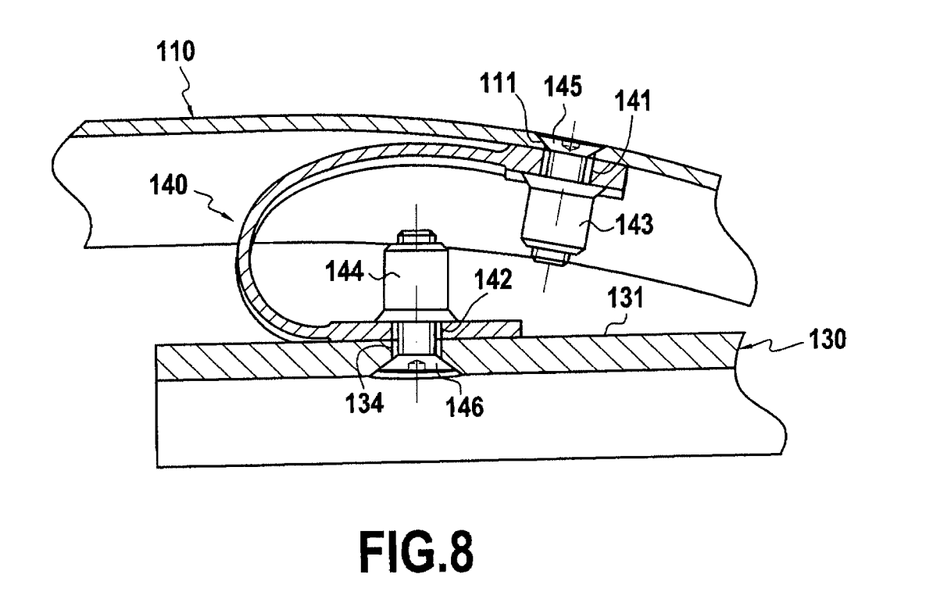
FIG. 8 is a section view on section plane VIII of FIG. 4.

As shown in FIGS. 7 and 8, the top portions of the tabs 140 include orifices 141 that co-operate with orifices 111 in the outer shroud 110 for the purpose of passing fastener screws 145 to nuts 143 that are crimped against the inside faces of the tabs 140 around the orifices 141. The bottom portions of the tabs 140 include orifices 142 that co-operate with orifices 134 in the lobed structure 130 for passing fastener screws 146 to nuts 144 that are crimped to the inside faces of the tabs 140 around the orifices 142.

The upstream end of the outer shroud 110 includes a flange 112 (FIG. 6). Likewise, the inner shroud 120 includes a flange 121 at its upstream end. The inner shroud 120 is fastened to the outer shroud 110 by assembling the flanges 112 and 121, one against the other. The flanges 112 and 121 include orifices 123 that are distributed over the surfaces thereof and that co-operate with one another to pass screws 126 that are tightened in nuts 125 that are crimped to the face of the flange 121 that is remote from its face for assembling with the flange 112 (FIG. 9).

Figure 9:
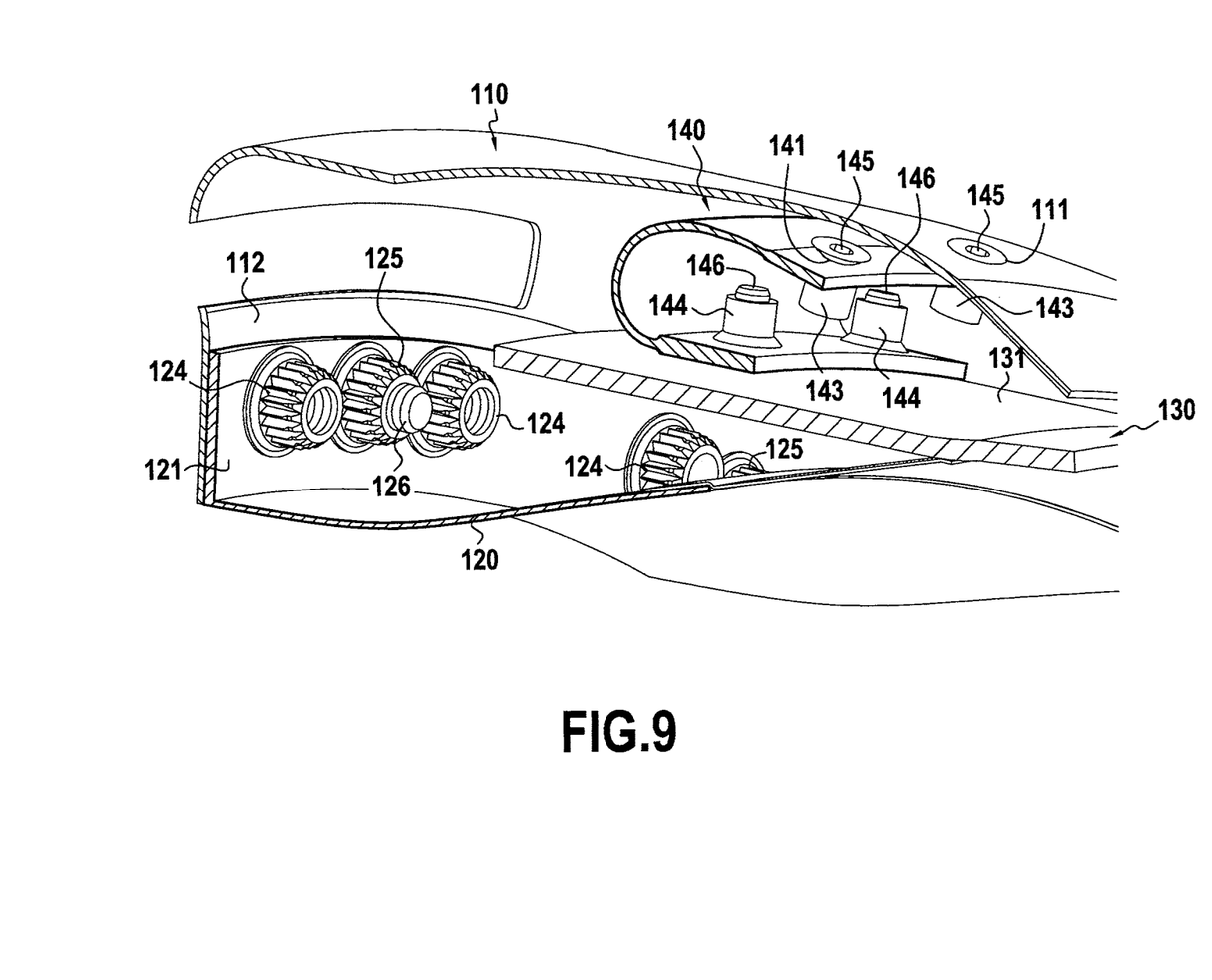
FIG. 9 is a perspective view from behind on section plane VI of FIG. 4.

Furthermore, in order to enable the mixer to be secured to the exhaust casing of the turbojet, the flanges 112 and 121 further include orifices 122 that are distributed over the surfaces thereof (FIG. 6) and that co-operate with one another to pass screws (not shown) that are tightened in nuts 124 that are crimped to the face of the flange 121 opposite from its face for assembly with the flange 112 (FIG. 9).

In the mixer 100, the lobed structure 130 is attached to the outer shroud 110 that constitutes a structural outer cowling of the mixer. Since the outer shroud 110 mainly receives the cold outer stream, it expands less than the inner shroud 120 that serves to extend the inner flow section of the engine in order to channel the hot inner stream coming from the combustion chamber. Consequently, by attaching the lobed structure to the outer shroud, the mechanical stresses on the CMC lobed structure are reduced, as are the stresses on the flexible fastener tabs used for attaching the lobed structure. Consequently, the number and of the size of these fastener tabs can be reduced, thus making it possible to lighten the overall weight of the mixer structure.

In addition, and as shown in FIG. 9, the tabs 140 are relatively compact, while the inner shroud 120 and the outer shroud 110 a fastened directly to each other via their respective flanges 121 and 112, thus making it possible to give the mixer 100 a structure that is very compact and that is suitable for incorporating in cavities of low height.

Using a ceramic matrix composite material for the lobed structure of the mixer in accordance with the invention makes it possible to reduce the weight of a nozzle in significant manner compared with a conventional nozzle fitted with a mixer that is made entirely of metal. Using a lobed structure made of ceramic matrix composite material instead of a metal enables the weight of the nozzle to be reduced by about 40%. Furthermore, even in a mixer having a lobed structure made of ceramic matrix composite material, the particular design of the mixer of the present invention makes it possible to further reduce the weight of the mixer. For equivalent dimensions, the mixer of the present invention weighs 2 kilograms (kg) less than that made in accordance with the teaching of document WO 2006/035186.

Thus, by means of the design of the mixer of the invention, it is possible to reduce the cantilevered-out weight, thereby potentially limiting the mechanical loading on the flange of the exhaust casing of the nozzle in the event of heavy loads being generated, e.g. by the loss of a blade or by an unbalance. Because of its reduced weight, the mixer of the invention also makes it possible to reduce the forces and the interfaces between the engine and the pylon of the airplane.

The invention claimed is:

1. A mixer for a separate-stream nozzle of a turbojet, the mixer being designed to mix a hot inner stream from a combustion chamber of the turbojet with a cold outer stream from a fan of the turbojet, said mixer comprising an inner shroud defining a flow channel for said hot inner stream, an outer shroud disposed around the inner shroud and co-operating therewith to define a flow channel for said cold outer stream, and a lobed structure having lobes that extend longitudinally from the trailing edges of said shrouds, said lobed structure being made of a ceramic matrix composite material, the mixer being characterized in that the lobed structure comprises an upstream end that extends circumferentially and is located radially between said inner shroud and said outer shroud and is attached to the outer shroud by flexible connection means.

2. A mixer according to claim 1, characterized in that the lobed structure is attached to said outer shroud via flexible fastener tabs made of metallic material.

3. A mixer according to claim 1, characterized in that the inner shroud is fastened to the outer shroud via rigid connection means.

4. A mixer according to claim 3, characterized in that the inner shroud includes a first flange and the outer shroud includes a second flange, said first and second flanges being fastened against one another, the second flange of the outer shroud forming a fastener flange for the exhaust casing of the nozzle.

5. A mixer according to claim 4, characterized in that each of the first and second flanges includes a plurality of orifices co-operating with one another, a nut being crimped on the first flange of the inner shroud in register with each orifice therein.

6. A mixer according to claim 1, characterized in that the lobed structure is made of a SiC/SiC ceramic matrix composite material.

7. A mixer according to claim 1, characterized in that the lobed structure is made up of a plurality of assembled-together sectors.

8. A mixer according to claim 1, characterized in that the lobed structure is made as a single piece.

9. A turbojet including a separate-stream nozzle, characterized in that the nozzle is fitted with a mixer according to claim 1.

10. A mixer according to claim 2, characterized in that:
the inner shroud is fastened to the outer shroud via rigid connection means;
the inner shroud includes a first flange and the outer shroud includes a second flange, said first and second flanges being fastened against one another, the second flange of the outer shroud forming a fastener flange for the exhaust casing of the nozzle;
each of the first and second flanges includes a plurality of orifices co-operating with one another, a nut being crimped on the first flange of the inner shroud in register with each orifice therein; and
the lobed structure is made of a SiC/SiC ceramic matrix composite material.

11. A mixer according to claim 10, characterized in that the lobed structure is made up of a plurality of assembled-together sectors.

12. A mixer according to claim 10, characterized in that the lobed structure is made as a single piece.

13. A turbojet including a separate-stream nozzle, characterized in that the nozzle is fitted with a mixer according to claim 10.

14. A turbojet including a separate-stream nozzle, characterized in that the nozzle is fitted with a mixer according to claim 11.

15. A turbojet including a separate-stream nozzle, characterized in that the nozzle is fitted with a mixer according to claim 12.

* * * * *